United States Patent
Aggarwal et al.

(10) Patent No.: US 11,709,962 B2
(45) Date of Patent: Jul. 25, 2023

(54) CONFIDENTIAL INFORMATION IDENTIFICATION BASED UPON COMMUNICATION RECIPIENT

(71) Applicant: International Business Machines Corporation, Armonk, NY (US)

(72) Inventors: Pooja Aggarwal, Bangalore (IN); Prateeti Mohapatra, Bangalore (IN); Saneem Ahmed Chemmengath, Kozhikode (IN); Kuntal Dey, New Delhi (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 847 days.

(21) Appl. No.: 16/710,826

(22) Filed: Dec. 11, 2019

(65) Prior Publication Data
US 2021/0182420 A1 Jun. 17, 2021

(51) Int. Cl.
*G06F 21/62* (2013.01)
*G06F 21/31* (2013.01)
(Continued)

(52) U.S. Cl.
CPC .......... *G06F 21/6245* (2013.01); *G06F 9/542* (2013.01); *G06F 16/335* (2019.01);
(Continued)

(58) Field of Classification Search
CPC .. G06F 21/6245; G06F 16/335; G06F 40/205; G06F 9/542; G06F 21/31; H04L 51/52
See application file for complete search history.

(56) References Cited

U.S. PATENT DOCUMENTS 7,519,984 B2   4/2009   Bhogal et al.
7,672,999 B2   3/2010   Basson et al.
(Continued)

OTHER PUBLICATIONS

Cedric Du Mouza et al., "Towards an Automatic Detection of Sensitive Information in a Database", 2010 Second International Conference on Advances in Databases, Knowledge, and Data Applications, 2010, 6 pages, IEEE Digital Library.
(Continued)

*Primary Examiner* — Sherrod L Keaton
(74) *Attorney, Agent, or Firm* — Ference & Associates LLC

(57) ABSTRACT

One embodiment provides a method, including: receiving an indication of an addition of a new participant in a textual communication between at least two existing participants; identifying at least one confidential topic contained within the textual communication by (i) parsing the textual communication and (ii) identifying at least one topic contained within the textual communication; the identifying comprising (i) accessing a confidentiality graph comprising (a) nodes representing participants and (b) edges representing confidential concepts that are acceptable discussion topics between participants connected by a corresponding edge and (ii) determining that an edge corresponding to the at least one confidential topic does not connect the new participant with both of the existing participants; and alerting one of the existing participants that the at least one confidential topic is included in the textual communication to be sent to the new participant.

17 Claims, 5 Drawing Sheets

(51) Int. Cl.
  *G06F 40/205* (2020.01)
  *G06F 16/35* (2019.01)
  *G06F 9/54* (2006.01)
  *G06F 16/335* (2019.01)
  *H04L 51/52* (2022.01)
(52) U.S. Cl.
  CPC ............ *G06F 16/355* (2019.01); *G06F 21/31* (2013.01); *G06F 40/205* (2020.01); *H04L 51/52* (2022.05)

(56) References Cited

U.S. PATENT DOCUMENTS

| | | | |
|---|---|---|---|
| 7,756,843 | B1 | 7/2010 | Palmer |
| 8,091,138 | B2 | 1/2012 | Yellepeddy et al. |
| 8,352,535 | B2 | 1/2013 | Peled et al. |
| 8,473,443 | B2 | 6/2013 | Lewis et al. |
| 9,489,376 | B2 | 11/2016 | Thomason et al. |
| 10,719,624 | B2 * | 7/2020 | Abdel-Fattah ...... H04L 63/0428 |
| 2009/0019553 | A1 | 1/2009 | Narayanaswami |
| 2012/0011192 | A1 * | 1/2012 | Meister .................. H04L 51/04 709/206 |
| 2013/0340089 | A1 * | 12/2013 | Steinberg ............... G06Q 50/01 726/27 |
| 2016/0308814 | A1 | 10/2016 | Meister et al. |
| 2017/0063755 | A1 | 3/2017 | Pulfer et al. |
| 2017/0093787 | A1 | 3/2017 | Harihara Iyer et al. |
| 2019/0363945 | A1 * | 11/2019 | Rogynskyy ........... G06F 40/295 |

OTHER PUBLICATIONS

David Sanchez et al., "Detecting Sensitive Information from Textual Documents: An Information-Theoretic Approach", MDAI 2012, 13 pages, V. Torra et al. (Editors), Springer-Verlag, Berlin Heidelberg, Germany.

Dengyong Zhou et al., "Learning with Hypergraphs: Clustering, Classification, and Embedding", Advances in neural information processing systems, Jan. 2006, 9 pages, ResearchGate.

* cited by examiner

201

Hi User1

Please share the status on....

Thank you,
User2

----- Original message -----
From: User3/@email
To: User2/@email
Cc: User4/@email, Hi User2,
Nice idea lets discuss this after our call. Can u ask User1 regarding project update on ... mark me as well
Thanks & Regards ----- Forwarded by User3/@email on 02/15/2019 10:27 AM -----

From: User3/@email
To: User2/@email
Cc: User4/@email, Hema Subject: Re: QueT : Queries on CSAR Scan Report for COO I was thinking what u mentioned last time.. On those lines I thinking that using ... we have improve case routing. Use... XXX Thanks for your cooperation.

Thanks & Regards
User3

From: User3/@email
to: User2/@email

My manager as asked to focus on patients more this year..
Thanks for your cooperation.

Thanks & Regards
User3

202

Context change: a new idea and project update
Maybe you would like to hide the discussion around case routing before sending the email out to User1

FIG. 2

CONFIDENTIAL INFORMATION IDENTIFICATION BASED UPON COMMUNICATION RECIPIENT

BACKGROUND

The use of textual communications (e.g., emails, text messages, instant messenger messages, etc.) is very common in both personal and business settings. The textual communications provide a record of a conversation thereby allowing a person to revisit the conversation. Additionally, the record may be necessary to assist people in remembering decisions and other particulars of the conversation. Textual communications also allow for multiple people to be included in the conversation without requiring everyone included in the conversation to be available for a conference call at the same time, which may be particularly difficult when people are located in different locations. Textual communications also allow people time to process and analyze the conversation in order to provide accurate answers or input with respect to the conversation. Thus, textual communications are common and, many times, a preferred method of communication among a group of people.

BRIEF SUMMARY

In summary, one aspect of the invention provides a method, comprising: receiving an indication of an addition of a new participant in a textual communication between at least two existing participants, wherein the indication is generated in response to one of the existing participants sending the textual communication to the new participant; identifying at least one confidential topic contained within the textual communication by (i) parsing the textual communication and (ii) identifying, from the parsing, at least one topic contained within the textual communication, wherein the at least one confidential topic is confidential with respect to the new participant; the identifying comprising (i) accessing a confidentiality graph comprising (a) nodes representing participants and (b) edges representing confidential concepts that are acceptable discussion topics between participants connected by a corresponding edge and (ii) determining that an edge corresponding to the at least one confidential topic does not connect the new participant with both of the existing participants; and alerting, before the textual communication is sent to the new participant, one of the existing participants that the at least one confidential topic is included in the textual communication to be sent to the new participant.

Another aspect of the invention provides an apparatus, comprising: at least one processor; and a computer readable storage medium having computer readable program code embodied therewith and executable by the at least one processor, the computer readable program code comprising: computer readable program code configured to receive an indication of an addition of a new participant in a textual communication between at least two existing participants, wherein the indication is generated in response to one of the existing participants sending the textual communication to the new participant; computer readable program code configured to identify at least one confidential topic contained within the textual communication by (i) parsing the textual communication and (ii) identifying, from the parsing, at least one topic contained within the textual communication, wherein the at least one confidential topic is confidential with respect to the new participant; the identifying comprising (i) accessing a confidentiality graph comprising (a) nodes representing participants and (b) edges representing confidential concepts that are acceptable discussion topics between participants connected by a corresponding edge and (ii) determining that an edge corresponding to the at least one confidential topic does not connect the new participant with both of the existing participants; and computer readable program code configured to alert, before the textual communication is sent to the new participant, one of the existing participants that the at least one confidential topic is included in the textual communication to be sent to the new participant.

An additional aspect of the invention provides a computer program product, comprising: a computer readable storage medium having computer readable program code embodied therewith, the computer readable program code executable by a processor and comprising: computer readable program code configured to receive an indication of an addition of a new participant in a textual communication between at least two existing participants, wherein the indication is generated in response to one of the existing participants sending the textual communication to the new participant; computer readable program code configured to identify at least one confidential topic contained within the textual communication by (i) parsing the textual communication and (ii) identifying, from the parsing, at least one topic contained within the textual communication, wherein the at least one confidential topic is confidential with respect to the new participant; the identifying comprising (i) accessing a confidentiality graph comprising (a) nodes representing participants and (b) edges representing confidential concepts that are acceptable discussion topics between participants connected by a corresponding edge and (ii) determining that an edge corresponding to the at least one confidential topic does not connect the new participant with both of the existing participants; and computer readable program code configured to alert, before the textual communication is sent to the new participant, one of the existing participants that the at least one confidential topic is included in the textual communication to be sent to the new participant.

A further aspect of the invention provides a method, comprising: generating a confidentiality network comprising nodes representing participants and edges representing concepts that are non-confidential discussion concepts when discussed between participants connected by a corresponding edge, wherein the generating comprises (i) mining historical communications between participants to identify discussion concepts discussed between participants and (ii) generating edges between the participants corresponding to the discussion concepts identified; receiving a communication having at least two established participants, wherein the communication includes an added recipient over the at least two established participants; before the communication is sent to the added recipient, identifying at least one concept within the communication that is confidential in view of the added recipient, wherein the identifying comprises (i) accessing the confidentiality network and (ii) determining an edge corresponding to the at least one concept and connecting at least one of the established participants and the added recipient is not included in the confidentiality network; and before the communication is sent to the added recipient, alerting at least one of the at least two established participants that the at least one concept is confidential in view of the added recipient and is included in the communication to be sent to the added recipient.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

BRIEF DESCRIPTION OF THE SEVERAL VIEWS OF THE DRAWINGS

FIG. 2 illustrates an example low risk confidential information alert.

DETAILED DESCRIPTION

Figure 1:
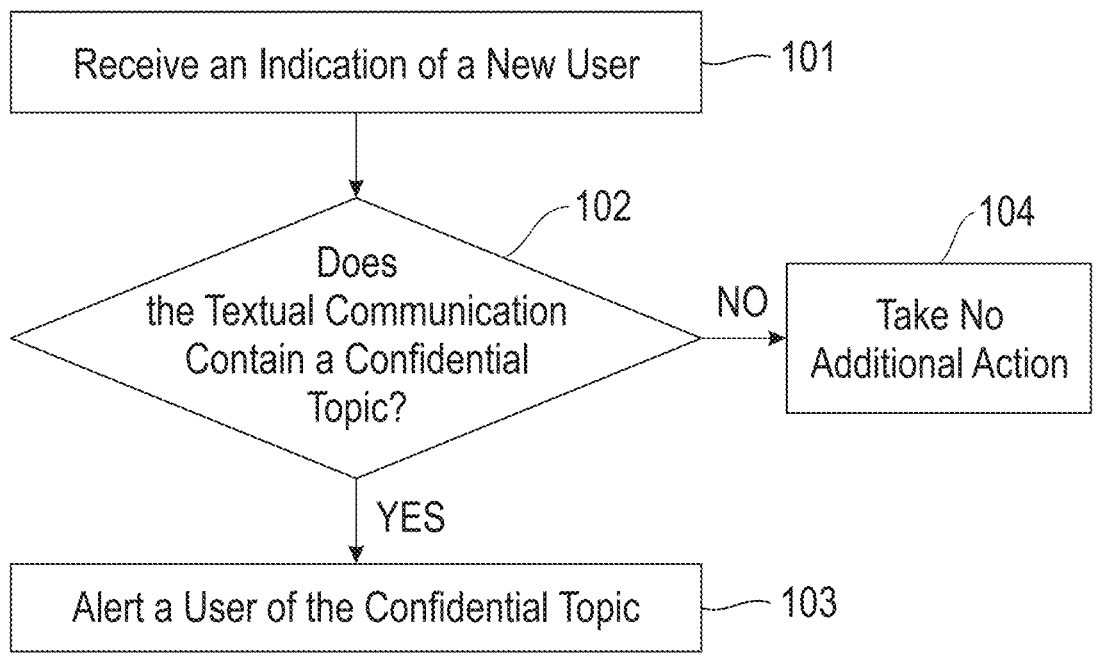
FIG. 1 illustrates a method of identifying confidential information in a communication where the information is identified as confidential based upon an added recipient to the communication and identified using a confidentiality graph.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The illustrated embodiments of the invention will be best understood by reference to the figures. The following description is intended only by way of example and simply illustrates certain selected exemplary embodiments of the invention as claimed herein. It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will be made here below to FIGS. 1-5. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 5. In accordance with an example embodiment, most if not all of the process steps, components and outputs discussed with respect to FIGS. 1-4 can be performed or utilized by way of a processing unit or units and system memory such as those indicated, respectively, at 16' and 28' in FIG. 5, whether on a server computer, a client computer, a node computer in a distributed network, or any combination thereof.

Textual communications (e.g., emails, text messages, instant messages, etc.) provide the ability to easily add a person to a conversation. Since the textual communication includes the conversation up to the point of adding another person, the person can easily review the previous communications to be apprised of the current state of the conversation rather than having to talk to a person already included on the conversation. However, while the ability to easily add a person to a communication may be very helpful in many circumstances, this ability can easily lead to revealing information to an added person that was not intended. For example, a communication between two or more people may be first directed to one topic and then may switch to another topic within the communication. This new topic may require the addition of another person. However, by adding this new person to the communication, the new person is now exposed to the first topic. If the first topic was confidential or should not have been shared with the new person, the confidentiality of that information has now been compromised.

Current solutions to preventing the exposure of confidential information require the confidential information to be identified. Typically, confidential information is identified based upon known formats of the confidential information (e.g., identification numbers, user credentials, telephone numbers, etc.). Confidential information may also be identified utilizing a list or database of confidential information. The information is then compared to the list or database and a match results in the information being categorized as confidential. However, these techniques do not assist in identifying confidential information that may not be a traditional form of confidential information or information that may only be confidential with respect to a recipient. In other words, the information may not be considered confidential when discussed between certain people, but may be confidential and should not be discussed with other people. Additionally, the conventional techniques do not account for information becoming confidential over time. For example, information may not be confidential at one point in time, but may be considered confidential at a different point in time.

Accordingly, an embodiment provides a system and method for identifying confidential information in a communication where the information is identified as confidential based upon an added recipient to the communication and identified using a confidentiality graph. The system receives an indication of an addition of a new user to a textual communication. The indication is responsive to an established person on the communication adding the new person to the communication and then attempting to send the communication (e.g., clicking the "send" button, pressing "enter", etc.). Before the system sends the communication to the new recipient, the system parses the communication to identify topics or concepts contained within the communication. The system then identifies if any of these topics or concepts are confidential with respect to the new user.

To determine if a topic is confidential, the system accesses a confidentiality network or graph that includes nodes and edges. The nodes represent users or people and the edges represent concepts or topics that are not confidential. Discussion of a topic represented by the edge between the nodes (representing people) is not considered confidential between those people. Thus, when two users represented by nodes do not have an edge corresponding to a topic within the communication, that topic is considered confidential with respect to those users. When a topic is determined to be confidential, the user who added the new user is alerted of the possible exposure of the confidential information. The user can then determine whether the information is actually confidential with respect to the new user and request that the system take action. For example, if the information is confidential the system can mask the confidential information before sending the communication. Alternatively, if the information is not confidential, the system can update the confidentiality graph to include the concept as an edge between the users.

Such a system provides a technical improvement over current systems for confidential information identification. The described system is able to identify that information included in a communication is confidential when recipients are added to a communication. In other words, the system is able to identify that information is confidential with respect to recipients of the communication. By accessing a confidentiality graph or network, the system can identify communication concepts or topics that are acceptable for discussion between users included on the communication. When a communication concept or topic is identified that is not identified as acceptable, the system alerts the sending user that confidential information may be exposed if the communication is sent. Thus, the described system allows for more accurate techniques for identifying confidential information. Additionally, the information that is identified as confidential does not have to be included in a database, thereby allowing the system to keep non-traditional confidential information from being exposed, which is not possible using conventional systems. Thus, the described system is more effective than conventional systems at ensuring the confidential information is not exposed to unintended people.

FIG. 1 illustrates a method for identifying confidential information in a communication where the information is identified as confidential based upon an added recipient to the communication and identified using a confidentiality graph. At 101, the system may receive an indication of an addition of a new user (or participant) to a textual communication (e.g., email, text message, instant message, etc.) between at least two users. For ease of readability, the users other than the new user may also be referred to as established (or existing) users as they are already established within the communication. The indication of an addition may be one of the established users adding a recipient to the communication chain. For example, if the textual communication is an email, one of the established users adding a user to the "To:" or "CC:" field, also referred to as a recipient field, may provide an indication of the addition of a new user. Since users can generally be removed from a communication before it is sent, the indication of the addition of a new user may not be received by the system until an indication to send the textual communication is received. Using the example of the email, the indication that the communication is to be sent to the new user may include the new user being included in a recipient field and the user providing input to the "Send" icon. Other indications that the textual communication should be sent are possible and are commonly known.

At 102, the system may determine whether the communication includes a confidential topic. In determining whether the communication includes a confidential topic, the system may parse the communication to identify topics or concepts contained within the communication. To identify topics contained within the communication the system may employ natural language processing techniques, for example, semantic parsers, parts of speech analyzers, syntactic parsers, natural language machine learning analyzers, and the like. Topics may be identified as the communication progresses, for example, after each communication is sent, or may only occur when a new recipient or other trigger event occurs. Another common trigger event may include a change to the confidentiality graph, discussed in more detail herein, with respect to any of the users included on the communication. As topics are identified, the communication may be tagged with metadata that identifies the topics so that upon subsequent topic identifications, the system does not need to completely reanalyze the communication if an analysis has already occurred. Alternatively, the system may reanalyze the entirety of the communication when an analysis occurs.

Once the topics of the communication are identified, the topics are mapped to a confidentiality network or graph that is used to determine if the topics are confidential with respect to the new user. The confidentiality network includes nodes and edges connecting nodes. The nodes correspond to users and the edges correspond to or represent concepts or topics. Edges or concepts that connect two users are considered non-confidential topics between the users connected by the corresponding edge. The concepts that are included in the confidentiality network may be concepts that are identified confidential. By only including concepts that are possibly confidential, the amount of processing and or storage requirements necessary for the confidentiality graph may be reduced. Additionally, by only including concepts that are possibly confidential, the number of alerts that may be provided to users is reduced. If the system cannot determine whether a concept could be confidential, the system may default to including the concept within the confidentiality graph in order to ensure that possible confidential concepts are not excluded from the confidentiality graph.

To determine if a concept may be confidential, the system may use one or more confidential segment matching techniques. One technique may be based upon keywords included in the communication. If a keyword designated as confidential is included in the communication, the system determines that the concept is possibly confidential. To generate keywords, the system may define confidential categories with the categories including keywords. Some of the confidential categories may correspond to traditional or known confidential information, for example, identification numbers, user credentials, telephone numbers, financial information, and the like.

Some of the confidential categories may be generated based upon user input. For example, users may provide words and phrases that should be considered confidential. From these provided words and phrases, the system can populate categories. To create and populate the categories the system may use vector representations of the words and phrases. The vector representations can then be used to identify words and phrases that are related in order to categorize the information. Vector representations may also be used to determine if a topic or concept or keyword included in the communication is similar to a word or phrase included in a confidential category. Using these vector representations allows the system to determine that a keyword or topic that is not already included in a confidential category is a confidential concept. In other words, even if the keyword or topic is not already included as a confidential topic, the system may determine that, based upon the vector representation, the keyword or topic is similar to a keyword or topic that is identified as confidential and should, therefore, be identified as confidential.

Another technique for determining if a topic is confidential is by utilizing a confidential classifier. A confidential classifier is a machine learning model that can be trained and used to determine if a topic is confidential. The machine learning model can be trained in a supervised manner using information that a user has identified as confidential. For example, the classifier may be provided with confidential documents, manually annotated documents, or the like. This information can be used to illustrate to the model what confidential information looks like. The model learns from this training and is then able to make a decision regarding the confidentiality of a topic that the model has not yet been exposed to. As the model makes more decisions regarding topics, the model has more historical data to use in making the decision. Additionally, the model may receive feedback regarding decisions that are made, for example, whether the decision was the correct decision. This information assists the model in becoming more accurate regarding decisions of confidentiality of topics over time.

Once the model has been trained, the model can be used to classify each segment or topic within a communication as confidential or not. For each topic that is identified as confidential, the system calculates a confidentiality score. To calculate the score, the system extracts key phrases from each topic or communication segment to determine whether the key phrases provide more information than common terms, specifically, whether the key phrases provide confidential information as compared to common terms. Based upon the type and number of key phrases within a segment, the system calculates the confidentiality score for the segment. If the confidentiality score meets or exceeds a predetermined threshold, then the segment is identified as confidential.

Not only can the system use the topics identified as confidential to determine whether the topic should be compared against the confidentiality graph or network, but the identified confidential topics can also be used to generate the confidentiality graph. People are added to the confidentiality graph as nodes within the graph. The edges between nodes represent concepts or topics that are confidential but that can be discussed between the people connected by the edge. Some of the edges may be prepopulated based upon different input or secondary sources, for example, hierarchy structures, user profiles (e.g., projects the user is assigned to, a manager the user reports to, relationship to another person, work history, etc.), project information, and the like. This information may illustrate a relationship between people represented by the nodes. The relationship, by nature, may provide an idea of information that is acceptable for communication between the users. For example, a manager and an employee of the manager may discuss salary or vacation topics, but that information should not be shared with other people. Thus, the mere existence of the manager/employee relationship indicates topics that are acceptable between the manager and employee but confidential with respect to other users.

Another way to generate the edges is to mine communications between users. In other words, as people communicate between each other, edges between the nodes can be populated. If the system determines that two users have discussed a topic that may be confidential, the system generates an edge between the nodes representing the confidential topic. This edge designates that the users are allowed to discuss the confidential topic. Thus, if two users are not connected by an edge representing a topic, the topic is considered confidential with respect to the two users. In other words, if the users have not previously discussed a topic or have some other identifying feature that would designate that the users can discuss the topic, the system would consider the topic confidential and that the users should not be included on a communication discussing the topic.

The confidentiality network is continually updated based upon conversations, changes in information, events, and the like. Changes in information or different events may cause edges between users to be changed or removed altogether. This allows the system to account for confidentiality drift over time. In other words, while a topic may be confidential with respect to a set of users at one point in time, it may become non-confidential at a later point in time, and vice versa. As an example, if a person is moved from a first project to a second project, discussion of information related to the first project may not be confidential when the person is working on that project but may become confidential when the person is no longer on that project. Accordingly, any edges regarding the project attached to the user need to be removed from the confidentiality network. To identify these changes, the system may continuously mine different information, for example, hierarchy charts, user profiles, conversations, and the like, to identify changes in a status or attribute that would cause information to change a confidentiality level.

Using the confidentiality network, the system can determine if the communication includes a confidential topic with respect to the added recipient. If the communication does not include a confidential topic, the system may take no additional action with respect to the communication at 104. In other words, the system may simply send the communication as requested by the established user. If, on the other hand, the communication includes confidential information, the system may alert the established user that confidential information is included in the communication before the communication is sent at 103.

Alerting the user may take a variety of forms and the alerts may have different alert levels. The alert may include highlighting the portion of the communication that corresponds to the information that has been identified as possibly confidential. This allows the established user to quickly determine whether the information is indeed confidential. Additionally, the alert may include an explanation of what is confidential and why the system has identified that an alert should be raised. The alerts may have different alert levels, for example, a high level alert, medium level alert, low level alert, and the like. Different alert levels may be based upon the confidence that the system has with respect to whether the information is confidential. In other words, depending on the context of the communication and other information contained within the confidentiality graph, the system can infer how likely the information is to be confidential.

For example, the system may infer that the information is probably not going to be confidential with respect to the new user, and so may provide a low level alert. An example scenario would be if User A and User B are discussing a particular possibly confidential topic. User B has already discussed such a topic with User C, but User A has not had a discussion with User C about this topic. Accordingly, in the confidentiality graph, User B and User C would be connected with an edge corresponding to the topic. Additionally, User A and User B would be connected with an edge corresponding to the topic. However, User A and User C would not be connected by an edge corresponding to the topic. However, since one of the established users, User B, does have an edge corresponding to the topic and connected to the new user, User C, the system would infer that the topic is likely not confidential with respect to User C. Nonetheless, since User A and User C are not connected, the system would provide an alert, but it would be a low-level alert because the information is likely not confidential with respect to User C in view of the connection to User B.

FIG. 2 illustrates an example low-level or yellow alert. A communication 201 is occurring between two users regarding routing a case. The topic changes to a project update and another user is added to the discussion. Based upon the context or topic change, the system performs a confidentiality analysis. The system determines, by accessing the confidentiality graph, that one of the two established users has discussed both case routing and project updates with the added recipient. However, the other of the two established users has not had discussions regarding both topics or contexts. Accordingly, the system generates an alert 202 notifying the established user of the context change and highlighting the possible confidential information. This alert is a low-level alert because the system has determined that this discussion is likely acceptable with the new recipient.

Figure 3:
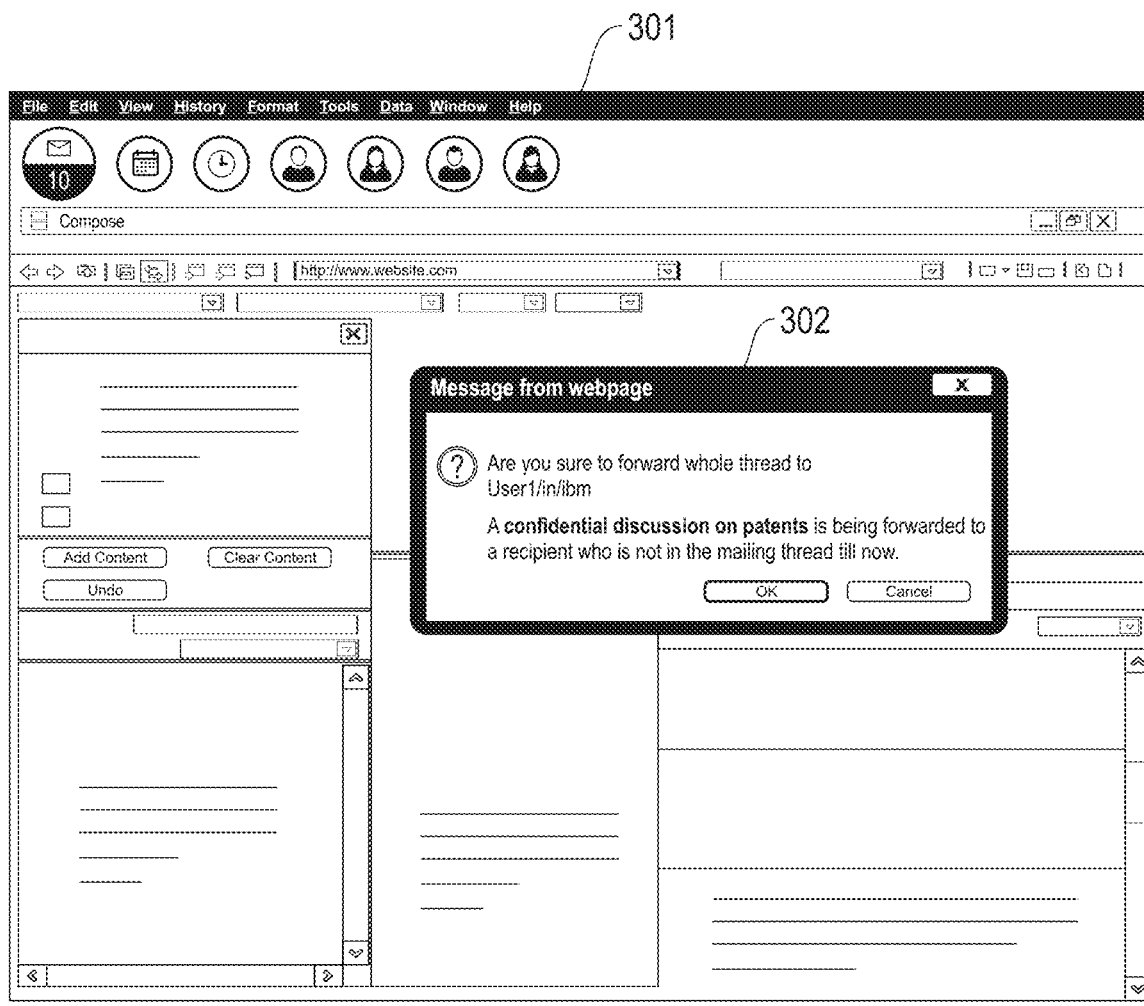
FIG. 3 illustrates an example high risk confidential information alert.

On the other hand, FIG. 3 illustrates an example high-level or red alert. A communication 301 is occurring regarding patents between a group of established users. When the conversation turns to a new topic and a new recipient is added, the system generates a high alert due to the confidential nature of the patent discussion and, based upon the confidentiality graph, determines that a patent discussion has never occurred between any of the established users and the new user. In other words, based upon the confidentiality graph, the system determines that the new user is not connected to any of the established users with an edge representing patent discussions. Accordingly, the system determines that the information is highly likely to be confidential with respect to the new user. Therefore, the alert is a high level alert. The alerts illustrated in both FIG. 2 and FIG. 3 are visually different. However, they may be the same or may be different based upon the alert level. In other words, the illustrated alerts are merely examples and are not intended to limit the alert type or graphic.

If the established user determines that the information is acceptable to be discussed with the new recipient, the user may provide the system with an indication of the same. Upon receiving such an indication, the system may take an action to update the confidentiality graph to create one or more edges corresponding to the confidential information that connect the new user and each of the established users. Thus, in the event that this information is discussed again, and no changes have been made that would result in confidentiality drift, the system will not alert the users since this information has been identified as an acceptable discussion point.

If, on the other hand, the established user determines that the information is confidential with respect to the new recipient, the user may provide the system with an indication of the same. Upon receiving such an indication, the system may take an action to mask the confidential information before the communication is sent to the additional recipient. Masking the confidential information may be performed for only the new recipient or may be performed for all recipients even if some of the recipients are allowed to see the confidential information. Masking the confidential information may include obscuring the confidential information (e.g., blurring, redacting, etc.) or may include completely removing the confidential information.

Figure 4:
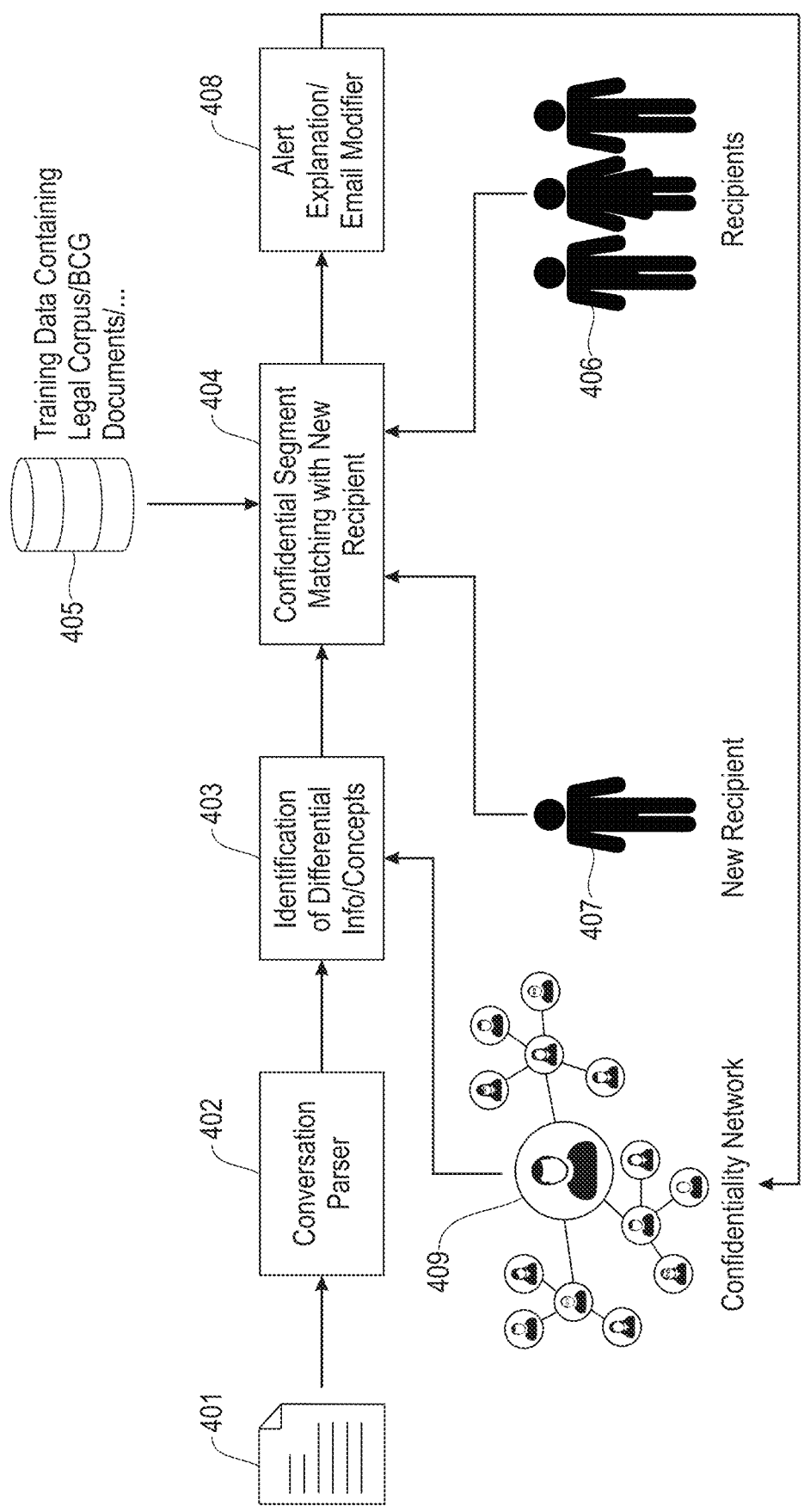
FIG. 4 illustrates an example system architecture for identifying confidential information in a communication where the information is identified as confidential based upon an added recipient to the communication and identified using a confidentiality graph.

FIG. 4 illustrates an overall system architecture example. A conversation 401 is received by the system. The system utilizes a conversation parser 402 and topic identification techniques 403 to establish an identification of topics and information included within the conversation 401. The system then accesses a confidentiality network 409 that is trained using training data 405 to match segments of the communication identified as possibly confidential to the established recipients 406 and the new recipient 407. In other words, the system attempts to determine if there are edges corresponding to the confidential segment that connect any of the established recipients 406 and the new recipient 407. If an edge corresponding to the confidential topic does not exist between any of the established recipients 406 and the new recipient 407, the system may generate an alert 408. The alert may include modifying the communication and an explanation of the alert. It should be understood that an alert may be raised even if the confidentiality graph includes a single edge corresponding to the topic between one of the established recipients and the new recipient. However, this may cause a change in the alert level. In other words, an alert will not be raised only if all of the established recipients have an edge connecting them to the new recipient. Based upon the established user's response to the alert, the system may take an action, for example, mask the confidential information, update the confidentiality network, and the like.

Thus, the described systems and methods represent a technical improvement over current systems for confidential information identification. Rather than requiring a database or list of confidential information or topics, the described system relies on historical communications to determine concepts and topics that are acceptable as discussion topics between users. Thus, the described system provides a system that allows for identifying non-traditional confidential information and ensuring that the confidential information, even if it is non-traditional confidential information, is not inadvertently exposed. In other words, the system can identify information that is confidential based upon a context of the communication, rather than simply determining if the information has been specifically designated as confidential. Additionally, since the system uses a confidentiality network to identify confidential information, the information can be identified as confidential not only with respect to particular people, but also with respect to particular points in time. Accordingly, even if the information is not confidential at one point in time, the system can still identify it as confidential if it is considered confidential at a different point in time. Thus, the described system and method provide a system that is able to ensure that a broader range of confidential information is not exposed, compared with traditional techniques.

Figure 5:
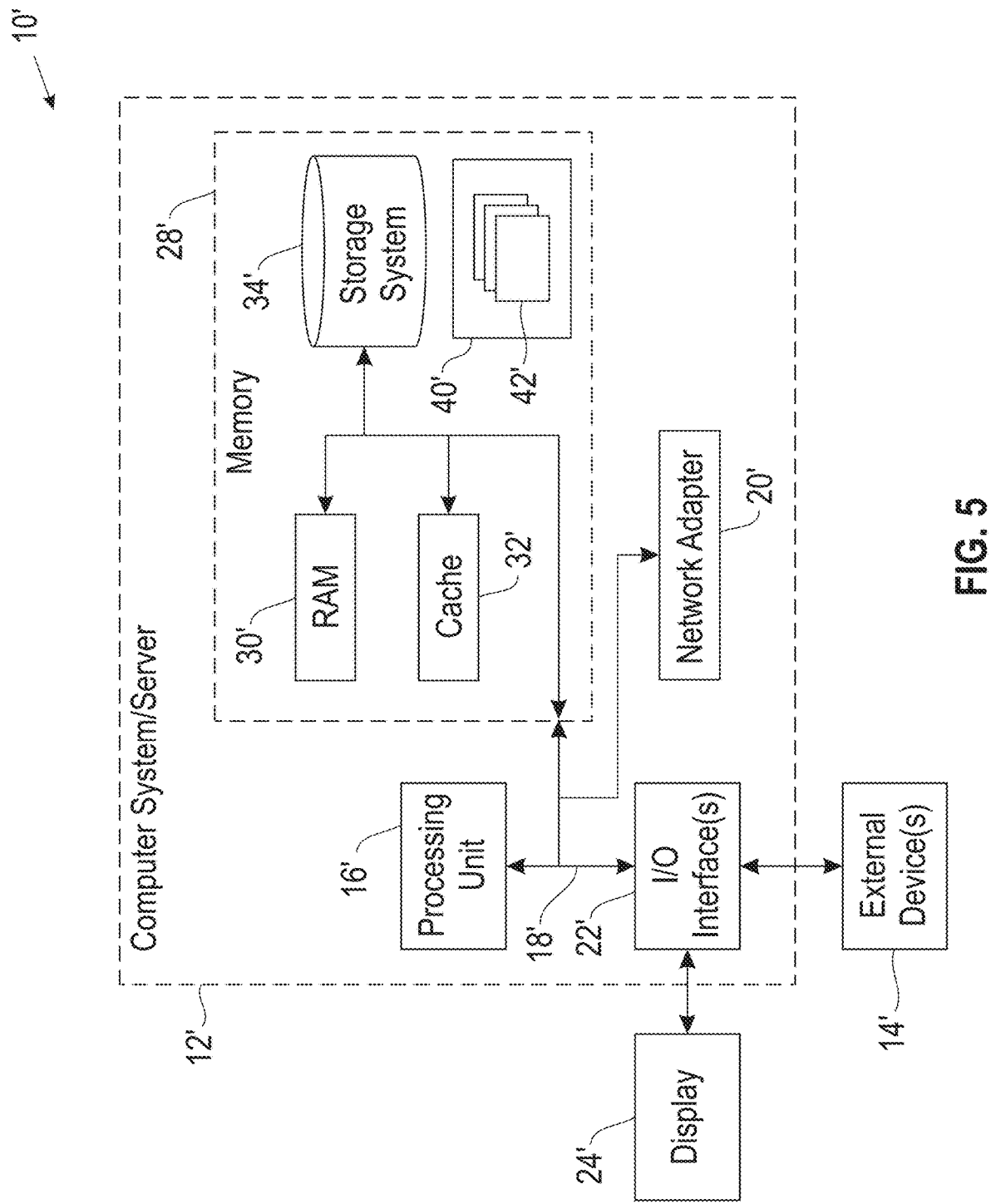
FIG. 5 illustrates a computer system.

As shown in FIG. 5, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, comprising:
receiving an indication of an addition of a new participant in an ongoing textual communication between at least two existing participants, wherein the indication is generated in response to one of the existing participants sending the ongoing textual communication to the new participant;
identifying at least one confidential topic contained within the ongoing textual communication by (i) parsing the ongoing textual communication and (ii) identifying, from the parsing, at least one topic contained within the ongoing textual communication, wherein the at least one confidential topic is confidential with respect to the new participant and not confidential with respect to the at least two existing participants;
the identifying comprising (i) accessing a confidentiality graph comprising (a) nodes representing participants and (b) edges representing confidential concepts that are acceptable discussion topics between participants connected by a corresponding edge and (ii) determining that an edge corresponding to the at least one confidential topic does not connect the new participant with the at least two existing participants, wherein the confidentiality graph is dynamically updated at least during conversations between participants, wherein the dynamically updating comprises identifying, by continuously mining different information, changes in a status or attribute indicating a change in a confidentiality level;
alerting, before the ongoing textual communication is sent to the new participant, one of the existing participants that the at least one confidential topic is included in the ongoing textual communication to be sent to the new participant; and
receiving, responsive to the alert, at least one of (i) an input from one of the existing participants to allow the new participant access to the at least one confidential topic, wherein the confidentiality graph is updated based upon the input to allow the new participant access and (ii) an input from one of the existing participants that the at least one confidential topic is confidential with respect to the new participant, wherein the at least one confidential topic is masked from the new participant.

2. The method of claim 1,
wherein the updating the confidentiality graph comprises updating the confidentiality graph to include an edge corresponding to the at least one confidential topic between the new participant and each of the at least two participants.

3. The method of claim 1, wherein the alerting comprises highlighting the at least one confidential topic within the textual communication.

4. The method of claim 1, wherein the confidentiality graph is generated by (i) mining textual communications between participants to identify discussion topics discussed between participants and (ii) generating edges between the participants corresponding to the discussion topics identified.

5. The method of claim 1, wherein the confidentiality graph is generated by (i) accessing at least one secondary source to identify relationships between participants, wherein the relationships provide an indication of confidential topics that are acceptable for discussion between the participants and (ii) generating edges between the participants corresponding to the confidential topics.

6. The method of claim 1, wherein the alerting comprises providing an alert from one of a plurality of alert levels, wherein the alert level of the alert is based upon a confidence level that the at least one confidential topic is confidential with respect to the new participant.

7. The method of claim 1, wherein the identifying comprises (i) assigning a confidentiality score for a topic contained within the textual communication by using a machine learning classifier and (ii) identifying the topic as confidential when the confidentiality score exceeds a predetermined threshold.

8. The method of claim 1, wherein the identifying comprises (i) creating confidential categories using vector representations of words and phrases and (ii) identifying a topic included within the textual communication as a confidential topic when the topic is included within one of the confidential categories.

9. An apparatus, comprising:
at least one processor; and
a computer readable storage medium having computer readable program code embodied therewith and executable by the at least one processor, the computer readable program code comprising:
computer readable program code configured to receive an indication of an addition of a new participant in an ongoing textual communication between at least two existing participants, wherein the indication is generated in response to one of the existing participants sending the ongoing textual communication to the new participant;
computer readable program code configured to identify at least one confidential topic contained within the ongoing textual communication by (i) parsing the ongoing textual communication and (ii) identifying, from the parsing, at least one topic contained within the ongoing textual communication, wherein the at least one confidential topic is confidential with respect to the new participant and not confidential with respect to the at least two existing participants;
the identifying comprising (i) accessing a confidentiality graph comprising (a) nodes representing participants and (b) edges representing confidential concepts that are acceptable discussion topics between participants connected by a corresponding edge and (ii) determining that an edge corresponding to the at least one confidential topic does not connect the new participant with the at least two existing participants, wherein the confidentiality graph is dynamically updated at least during conversations between participants, wherein the dynamically updating comprises identifying, by continuously mining different information, changes in a status or attribute indicating a change in a confidentiality level;
computer readable program code configured to alert, before the ongoing textual communication is sent to the new participant, one of the existing participants that the at least one confidential topic is included in the ongoing textual communication to be sent to the new participant; and
computer readable program code configured to receive, responsive to the alert, at least one of (i) an input from one of the existing participants to allow the new participant access to the at least one confidential topic, wherein the confidentiality graph is updated based upon the input to allow the new participant access and (ii) an input from one of the existing participants that the at least one confidential topic is confidential with respect to the new participant, wherein the at least one confidential topic is masked from the new participant.

10. A computer program product, comprising:
a computer readable storage medium having computer readable program code embodied therewith, the computer readable program code executable by a processor and comprising:
computer readable program code configured to receive an indication of an addition of a new participant in an ongoing textual communication between at least two existing participants, wherein the indication is generated in response to one of the existing participants sending the ongoing textual communication to the new participant;
computer readable program code configured to identify at least one confidential topic contained within the ongoing textual communication by (i) parsing the ongoing textual communication and (ii) identifying, from the parsing, at least one topic contained within the ongoing textual communication, wherein the at least one confidential topic is confidential with respect to the new participant and not confidential with respect to the at least two existing participants;
the identifying comprising (i) accessing a confidentiality graph comprising (a) nodes representing participants and (b) edges representing confidential concepts that are acceptable discussion topics between participants connected by a corresponding edge and (ii) determining that an edge corresponding to the at least one confidential topic does not connect the new participant with the at least two existing participants, wherein the confidentiality graph is dynamically updated at least during conversations between participants, wherein the dynamically updating comprises identifying, by continuously mining different information, changes in a status or attribute indicating a change in a confidentiality level;
computer readable program code configured to alert, before the ongoing textual communication is sent to the new participant, one of the existing participants that the at least one confidential topic is included in the ongoing textual communication to be sent to the new participant; and
computer readable program code configured to receive, responsive to the alert, at least one of (i) an input from one of the existing participants to allow the new participant access to the at least one confidential topic, wherein the confidentiality graph is updated based upon the input to allow the new participant access and (ii) an input from one of the existing participants that the at least one confidential topic is confidential with respect to the new participant, wherein the at least one confidential topic is masked from the new participant.

11. The computer program product of claim 10,
wherein the updating the confidentiality graph comprises updating the confidentiality graph to include an edge corresponding to the at least one confidential topic between the new participant and each of the at least two participants.

12. The computer program product of claim 10, wherein the alerting comprises highlighting the at least one confidential topic within the textual communication.

13. The computer program product of claim 10, wherein the confidentiality graph is generated by (i) mining textual communications between participants to identify discussion topics discussed between participants and (ii) generating edges between the participants corresponding to the discussion topics identified.

14. The computer program product of claim 10, wherein the confidentiality graph is generated by (i) accessing at least one secondary source to identify relationships between participants, wherein the relationships provide an indication of confidential topics that are acceptable for discussion between the participants and (ii) generating edges between the participants corresponding to the confidential topics.

15. The computer program product of claim 10, wherein the alerting comprises providing an alert from one of a plurality of alert levels, wherein the alert level of the alert is based upon a confidence level that the at least one confidential topic is confidential with respect to the new participant.

16. The computer program product of claim 10, wherein the identifying comprises (i) assigning a confidentiality score for a topic contained within the textual communication by using a machine learning classifier and (ii) identifying the topic as confidential when the confidentiality score exceeds a predetermined threshold.

17. A method, comprising:
generating a confidentiality network comprising nodes representing participants and edges representing concepts that are non-confidential discussion concepts when discussed between participants connected by a corresponding edge, wherein the generating comprises (i) mining historical communications between participants to identify discussion concepts discussed between the participants and (ii) generating edges between the participants corresponding to the discussion concepts identified, wherein the confidentiality network is dynamically updated at least during ongoing conversations between the participants, wherein the dynamically updating comprises identifying, by continuously mining different information, changes in a status or attribute indicating a change in a confidentiality level;
receiving an ongoing communication having at least two established participants, wherein the ongoing communication includes an added recipient over the at least two established participants;
before the ongoing communication is sent to the added recipient, identifying at least one concept within the ongoing communication that is confidential in view of the added recipient, wherein the identifying comprises (i) accessing the confidentiality network and (ii) determining an edge (a) corresponding to the at least one concept and (b) that connects at least one of the established participants and the added recipient, is not included in the confidentiality network and wherein the at least one concept is not confidential with respect to the at least two established participants;
before the ongoing communication is sent to the added recipient, alerting at least one of the at least two established participants that the at least one concept is confidential in view of the added recipient and is included in the ongoing communication to be sent to the added recipient; and
receiving, responsive to the alerting, at least one of (i) an input from one of the at least two established participants to allow the added participant access to the at least one concept wherein the confidentiality network is updated based upon the input to allow the new participant access and (ii) an input from one of the at least two established participants that the at least one confidential topic is confidential with respect to the added participant, wherein the at least one confidential topic is masked from the added participant.

* * * * *